United States Patent
Duggan et al.

(10) Patent No.: US 12,536,288 B2
(45) Date of Patent: Jan. 27, 2026

(54) DETECTING BACKDOORS IN BINARY SOFTWARE CODE

(71) Applicant: BlackBerry Limited, Waterloo (CA)

(72) Inventors: Neil David Jonathan Duggan, Basingstoke (GB); Vincenzo Kazimierz Marcovecchio, Toronto (CA); Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 207 days.

(21) Appl. No.: 17/736,417

(22) Filed: May 4, 2022

(65) Prior Publication Data

US 2023/0359739 A1   Nov. 9, 2023

(51) Int. Cl.
G06F 21/57 (2013.01)

(52) U.S. Cl.
CPC ........ G06F 21/57 (2013.01); *G06F 2221/033* (2013.01)

(58) Field of Classification Search
CPC ... G06F 21/57; G06F 2221/033; G06F 21/562
See application file for complete search history.

(56) References Cited

U.S. PATENT DOCUMENTS

| | | | |
|---|---|---|---|
| 9,465,942 B1 | 10/2016 | Kane-Parry et al. | |
| 11,550,903 B1* | 1/2023 | Epstein | G06F 21/57 |
| 11,556,640 B1* | 1/2023 | Tully | G06N 5/01 |
| 2012/0079452 A1* | 3/2012 | Nir-Buchbinder | G06F 8/33 717/113 |
| 2014/0236919 A1* | 8/2014 | Liu | G06F 40/134 707/710 |
| 2018/0239898 A1 | 8/2018 | Haerterich et al. | |
| 2019/0220596 A1 | 7/2019 | Lie et al. | |
| 2019/0227902 A1 | 7/2019 | Cheng et al. | |
| 2019/0251251 A1 | 8/2019 | Carson | |
| 2021/0034757 A1* | 2/2021 | Boulton | G06F 21/566 |
| 2021/0200840 A1* | 7/2021 | Kannan | G06F 8/73 |
| 2021/0216636 A1* | 7/2021 | Devries | G06F 8/63 |
| 2022/0292201 A1 | 9/2022 | Sasaki et al. | |

OTHER PUBLICATIONS

Non-Final Office Action in U.S. Appl. No. 17/736,420, mailed on Apr. 4, 2024, 41 pages.
Extended European Search Report in European Appln. No. 23164043.4, mailed on Sep. 22, 2023, 6 pages.
U.S. Appl. No. 17/736,420, Duggan et al., May 4, 2022.

(Continued)

*Primary Examiner* — Jason K Gee
*Assistant Examiner* — Judy Bazna
(74) *Attorney, Agent, or Firm* — Fish & Richardson P.C.

(57) ABSTRACT

Systems, methods, and software can be used to detect backdoors in binary software code. In some aspects, a method comprises: obtaining, by a server, binary software code corresponding to source code; generating, by the server, a backdoor abstraction of the binary software code; and generating, by the server, a backdoor risk assessment based on the backdoor abstraction of the binary software code.

18 Claims, 3 Drawing Sheets

(56) References Cited

OTHER PUBLICATIONS

Apiiro.com [online], "Detect and Prevent the SolarWinds Build-Time Code Injection Attack" Feb. 17, 2021, [retrieved on Jul. 6, 2022], retrieved from : URL <https://apiiro.com/blog/detect-and-prevent-the-solarwinds-build-time-code-injection-attack/>, 5 pages.
Docs.microsoft.com [online], "Tutorial: Detect suspicious user activity with UEBA" Mar. 23, 2022, [retrieved on Jul. 6, 2022], retrieved from : URL <https://docs.microsoft.com/en-us/defender-cloud-apps/tutorial-suspicious-activity>, 10 pages.
Klieber, "A Technique for Decompiling Binary Code for Software Assurance and Localized Repair" Carnegie Mellon University, SEI Blog, Oct. 11, 2021, 6 pages.
Miyani, "Binpro: A Tool For Binary Backdoor Accountability in Code Audits" Master Thesis, University of Toronto, Electrical and Computer Engineering, Nov. 2016, 45 pages.
Non-Final Office Action in U.S. Appl. No. 17/736,420, mailed on Dec. 4, 2024, 25 pages.
Final Office Action in U.S. Appl. No. 17/736,420, mailed on May 22, 2025, 31 pages.
Office Action in European Appln. No. 23164601.9, mailed on Apr. 15, 2025, 4 pages.

\* cited by examiner

DETECTING BACKDOORS IN BINARY SOFTWARE CODE

TECHNICAL FIELD

The present disclosure relates to detecting backdoors in binary software code.

BACKGROUND

In some cases, software services can be provided by executable binary software code. The binary software code is computer software in a binary format. The computer software can be an application software, a system software (e.g., an operating system or a device driver), or a component thereof. The binary software code can also be referred to as binary code or executable code.

DESCRIPTION OF DRAWINGS

Like reference numbers and designations in the various drawings indicate like elements.

DETAILED DESCRIPTION

In some implementations, an attacker can insert malicious code on supplier's build server(s) and subvert the build process to insert a backdoor into the product software release. This type of attack is not done on the input source code, rather at the later stages of compilation and build, and malicious code is injected into the build process at the later stages. As a result, the source code may appear normal, however the binary software code generated by the build process may include the backdoor. This situation makes it hard to detect the backdoor in the released product that includes the binary software code.

Figure 1:
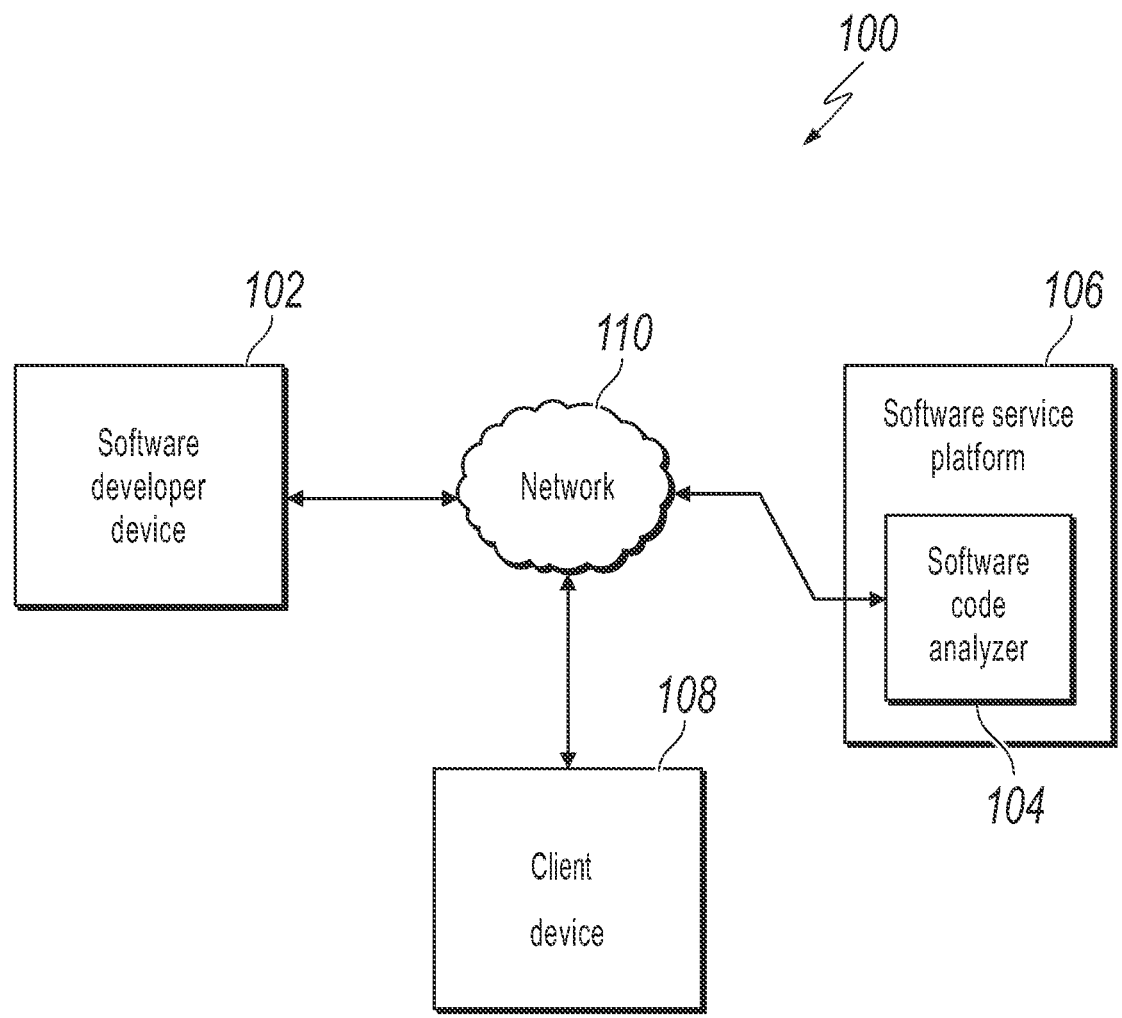
FIG. 1 is a schematic diagram showing an example communication system that detects backdoors in binary software code, according to an implementation.
Figure 2:
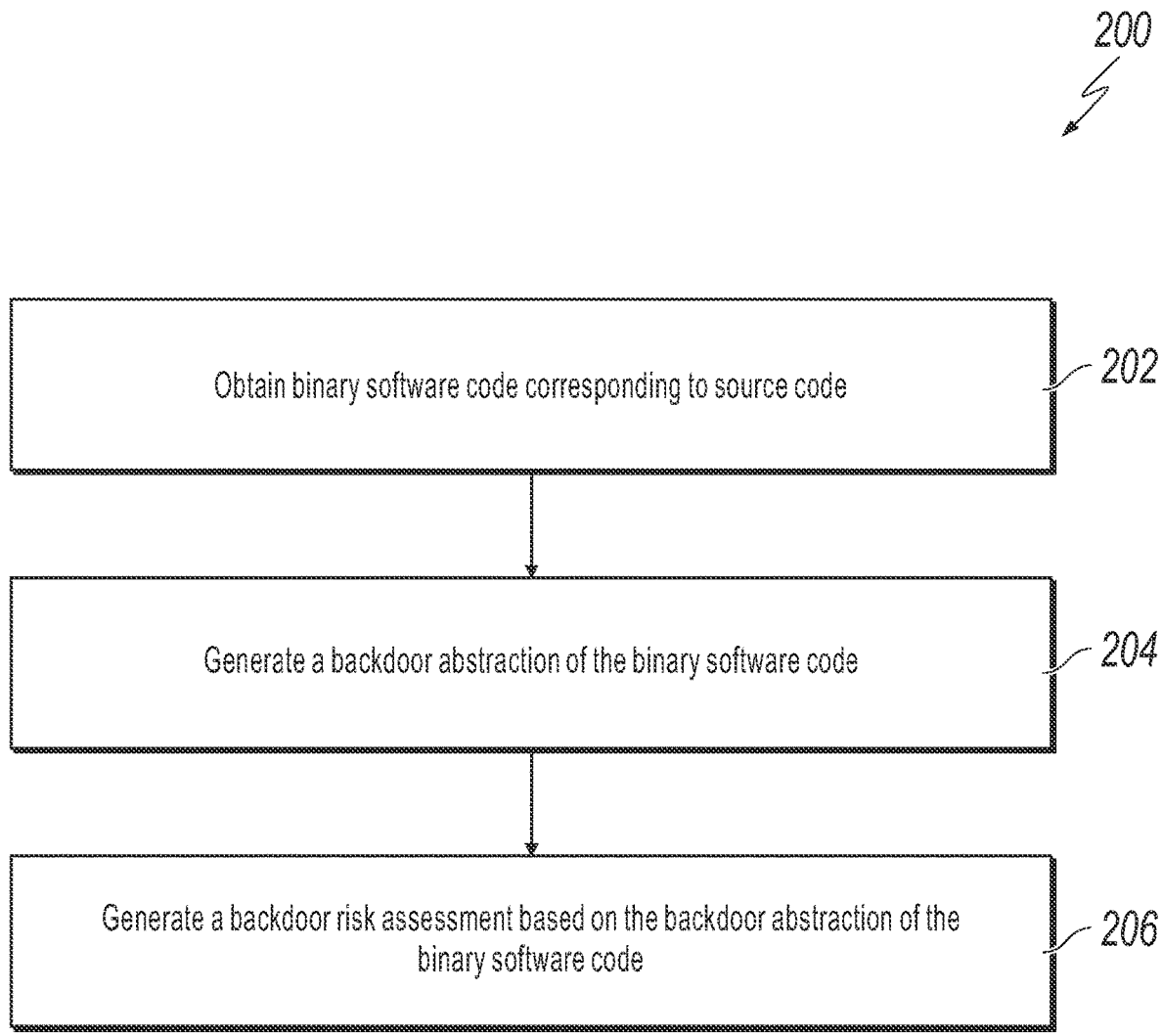
FIG. 2 is a flowchart showing an example method for detecting backdoors in binary software code, according to an implementation.
Figure 3:
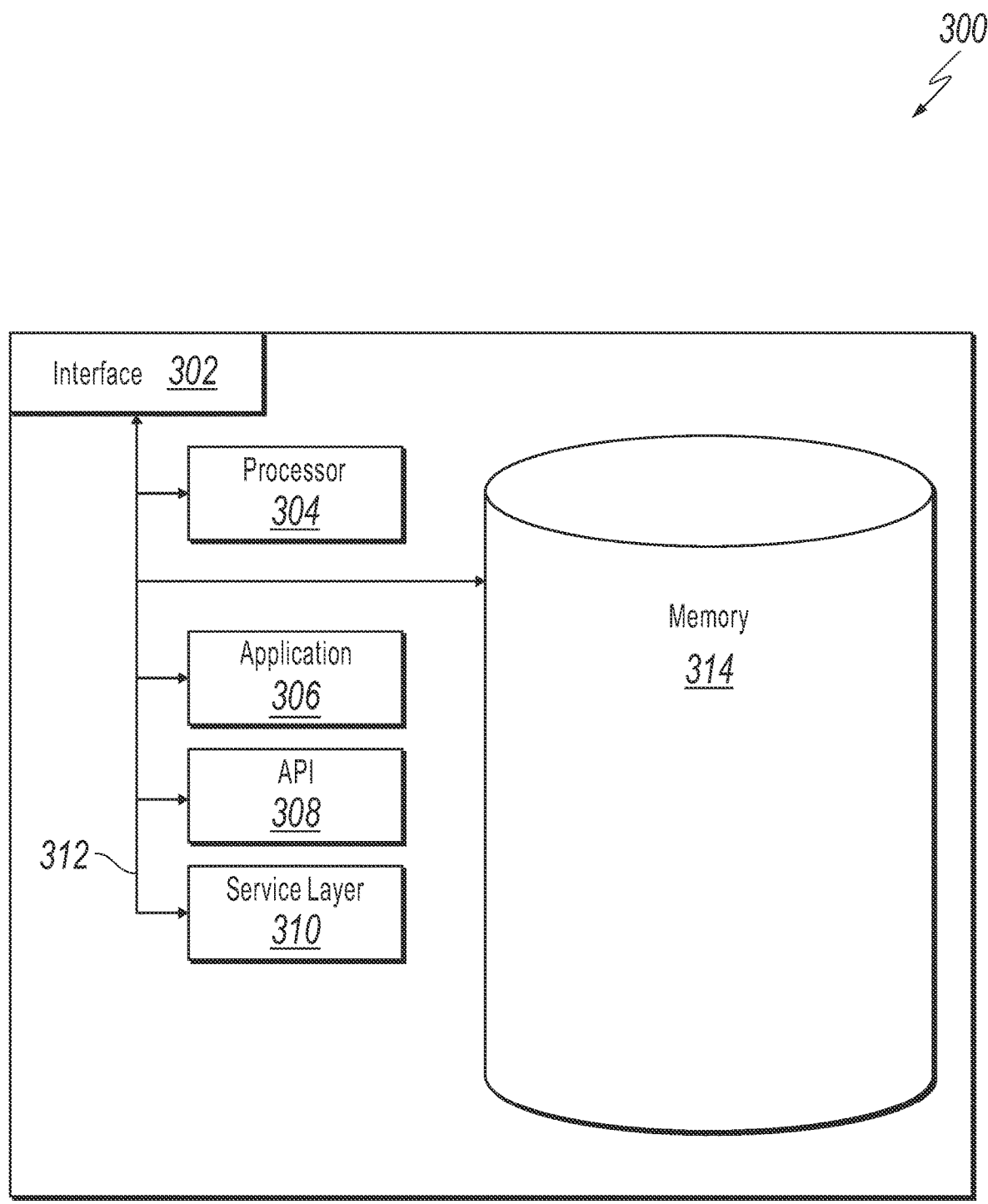
FIG. 3 is a high-level architecture block diagram of a computer according to an implementation.

In some cases, a server can examine and inspect the binary software code for code segments that indicate potential backdoors. The server can collect and classify these potential backdoors with a backdoor abstraction. For each potential backdoor in the backdoor abstraction, the server can parse the source code and determine if any portion of the source code corresponds to the potential backdoor. If no source code corresponds to the potential backdoor, the server can flag this mismatch so the potential backdoor can be investigated to discover if the build process has been compromised. For example, if the binary analysis has found a Hypertext Transfer Protocol Secure (HTTPS) connection to a given Uniform Resource Locator (URL), the source code will be searched to find if there is corresponding legitimate code that uses HTTPS application programming interface (API) and the given URL. FIGS. 1-3 and associated descriptions provide additional details of these implementations.

Techniques described herein produce one or more technical effects. In some cases, the techniques can improve efficiencies of identifying backdoors in binary software code. For example, the techniques do not try to recreate the original source code from the binary software code and then compare the recreated source code to the original source code in a blanket way, which is likely time consuming and can produce a high number of false positives. Instead, the techniques leverage binary inspection and knowledge of the characteristics of backdoors to classify the potential backdoors as an abstraction and then backtrack to the source code to determine whether any portion of the source code corresponds to the potential backdoors. Thus, the speed for identifying backdoors in binary software code is enhanced and the number of false positives is reduced. In some cases, the techniques can enhance security of the binary software code by identifying backdoors inserted at the build process. If a backdoor is inserted in the build process, the backdoor will be included in the binary software code but not included in the source code, and thus checking the source code alone cannot identify such backdoor. By identifying potential backdoors in the binary software code, the techniques can detect the backdoors inserted in the build process at the later stages.

FIG. 1 is a schematic diagram showing an example communication system 100 that provides data communications for detecting backdoors in binary software code, according to an implementation. At a high level, the example communication system 100 includes a software developer device 102 that is communicatively coupled with a software service platform 106 and a client device 108 over a network 110. In some cases, the software developer device 102 can be part of a software developer environment that includes multiple devices, servers, and cloud computing platforms.

The software developer device 102 represents an application, a set of applications, software, software modules, hardware, or any combination thereof, that can be configured to submit the source code and/or the binary software code to the software service platform 106. In some cases, the software developer device 102 and the software service platform 106 can be the same device. For example, the building of the source code, the creation of the binary software code, and the software code analyzer 104 can be implemented on the same device. The binary software code can be downloaded to the client device 108 to be executed on the client device 108. The binary software code can also be executed on the software service platform 106 to provide software service to the client device 108. Examples of the software services can include software as a service (SaaS) applications such as SALESFORCE, OFFICE 365, or other software application services.

The software service platform 106 includes a software code analyzer 104. The software code analyzer 104 represents an application, a set of applications, software, software modules, hardware, or any combination thereof, that is executed on the software service platform 106 to analyze binary software code based on backdoor abstractions of the binary software code. In some implementations, the software code analyzer 104 can obtain source code and binary software code corresponding to the source code, generate a backdoor abstraction of the binary software code, and generate a backdoor risk assessment based on the source code and the backdoor abstraction of the binary software code. FIGS. 2-3 and associated descriptions provide additional details of these implementations.

The software service platform 106 can be implemented using one or more computers, computer servers, or a cloud-computing platform.

The client device 108 represents an electronic device that accesses a software service provided by the software provider. In some cases, a browser or a client application can be executed on the client device 108 to communicate service requests and service responses with the software service platform of the software provide to obtain software services.

Turning to a general description, the client device 108 may include, without limitation, any of the following: endpoint, computing device, mobile device, mobile electronic device, user device, mobile station, subscriber station, portable electronic device, mobile communications device, wireless modem, wireless terminal, or other electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or other mobile communications devices having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used interchangeably herein.

The example communication system 100 includes the network 110. The network 110 represents an application, set of applications, software, software modules, hardware, or combination thereof, that can be configured to transmit data messages between the entities in the example communication system 100. The network 110 can include a wireless network, a wireline network, the Internet, or a combination thereof. For example, the network 110 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

FIG. 2 is a flowchart showing an example method 200 for detecting backdoors in binary software code, according to an implementation. The example method 200 can be implemented by a server, e.g., the software service platform 106 shown in FIG. 1. The example method 200 shown in FIG. 2 can be implemented using additional, fewer, or different operations, which can be performed in the order shown or in a different order.

The method 200 starts at step 202 with obtaining binary software code corresponding to source code. In some cases, the binary software code can include a stream of bytes that are generated by compiling the source code. Thus, the binary software code may not be in a human-readable format and may not be easily parsed or analyzed by a human.

The binary software code can be in a configuration of object code, executable code, or bytecode. An object code is the product of compiler output of a sequence of statements or instructions in a computer language. In a software development process, source code is created by programmers using a text editor or visual programming tool prior to compiliation. The source code is developed with a human-readable programming language, and may be saved in a text file. The source code can be transformed by an assembler or a compiler into binary software code that can be executed by the computer. The source code can be logically divided into multiple source files. Each source file is compiled independently into a corresponding object file that includes object code. The object codes in the object files are binary machine codes, but they may not be ready to be executed. The object files can include incomplete references to subroutines outside itself and placeholder addresses. During the linking process, these object files can be linked together to form one executable file that includes executable code that can be executed on a computing device. During the linking process, the linker can read the object files, resolve references between them, perform the final code layout in the memory that determines the addresses for the blocks of code and data, fix up the placeholder addresses with real addresses, and write out the executable file that contains the executable code.

A bytecode, also referred to as portable code or p-code, is a form of instruction set designed for efficient execution by a software interpreter. Bytecodes include compact numeric codes, constants, and references (normally numeric addresses) that encode the result of compiler parsing and performing semantic analysis of things like type, scope, and nesting depths of program objects. The bytecode includes instruction sets that have one-byte opcodes followed by optional parameters. Intermediate representations such as the bytecode may be output by programming language implementations to ease interpretation, or it may be used to reduce hardware and operating system dependence by allowing the same code to run cross-platform, on different devices. The bytecode may often be either directly executed on a virtual machine (a p-code machine i.e., interpreter), or it may be further compiled into machine code for better performance. In some cases, binary software code that is coded using platform-independent languages such as JAVA can be stored in the bytecode format.

In some cases, a software developer device (e.g., the software developer device 102) can compile the source code to generate the binary software code. The software developer device can then send both of the source code and the binary software code to a software code analyzer (e.g., the software code analyzer 104) for security analysis before including the binary software code in the software service for a client device (e.g., the client device 108).

In some cases, the software developer device can send the source code to the software code analyzer. The software code analyzer can then compile the source code to generate the binary software code for security analysis before including the binary software code in the software service for the client device.

In some cases, the software developer device can send the source code to a software provider. The software provider can then compile the source code to generate the binary software code and send both of the source code and the binary software code to the software code analyzer for security analysis before including the binary software code in the software service for the client device.

At step 204, the method 200 generates a backdoor abstraction of the binary software code. In some examples, the backdoor abstraction can be an Extensible Markup Language (XML) or a JavaScript Object Notation (JSON) file.

In some examples, the server can scan the binary software code to identify one or more text strings. In some implementations, text strings are encoded in software codes using one or more encoding protocols. Examples of the encoding protocols include the American Standard Code for Information Interchange (ASCII) encoding protocol or the Unicode protocol. A text strings includes one or more consecutive text characters. Examples of the text characters include alphabetic letter, numbers, punctuation marks, and symbols. In some cases, a text character can also be referred to as an alphanumeric character. Each text character is encoded into a binary number according to an encoding protocol. The size of the binary number can be 8 bits (1 byte), 16 bits (2 bytes), 32 bits (4 bytes), or 64 bits (8 bytes). For example, in ASCII protocol, the lower case letter "a" is encoded as 0x61, or "01100001" in binary number. In an encoding protocol, text characters are defined within a range of binary numbers. Therefore, by scanning the byte stream of the binary software code to check the values of each byte, two bytes, four bytes, or eight bytes (depending on the size of binary number of the encoding protocol), different text characters can be identified. For text characters that appear consecutively in the binary software codes, these text characters form a text string. In some cases, the scanning can be performed from the beginning of the binary software code (forward scanning), from the end of the binary software code (backward scanning), or from both the beginning and the end of the binary software code (parallel scanning).

In some cases, the identified text strings that are encoded in the binary software code can be used to determine one or more network addresses that are potential backdoors at which the binary software code may perform a network communication. For example, the text strings can include an email address or a URL. These text strings can be identified based on a specific character or a specific character string. For example, an email address can be identified by the "@" character in the text string. A URL can be identified by the "://," "HTTP," "HTTPS," or "FTP" characters in the text string. If such a specific character or character string is found in the text strings, the text strings can be parsed to determine a network address. For example, the portion of the text string after the specific character "@" can represent a network address of an email server. The portion of the text string after the specific character string "HTTPS" or "HTTP" can represent a network address of a web server. In one example, the portion of the text string that represents the network address can be in numerical form, e.g., an Internet Protocol (IP) v4 or v6 address. In another example, the portion of the text string that represents the network address can be in letter form, e.g., a Domain Name System (DNS) address that can be translated into an IP address by a DNS server.

In some implementations, the software service platform can determine a configuration of the binary software code. The configuration of the binary software code can be object code, executable code, or bytecode. In some cases, the software developer can submit the binary software code in the configuration of object code. In these cases, the binary software code can be a collection of multiple object files that are compressed into one archive file, e.g., a zip file. Alternatively, the software developer can perform the link process and submit the executable file containing executable code. In some cases, e.g., if the binary software code was developed using JAVA, the software developer can submit the binary software code in a bytecode configuration. The software service platform can determine the configuration based on the types of the file in which binary software code is submitted. For example, if the binary software code is submitted in a zip file, the software service platform can determine that the binary software code is in an object code configuration. If the binary software code is submitted in an .exe file, the software service platform can determine that the binary software code is in an executable code configuration. Alternatively or in combination, the software service platform can determine the configuration by scanning the first few bytes of the binary software code. The first few bytes of the binary software code can be the header, which stores configuration information of the binary software code.

In some cases, based on the determined configuration, the software service platform can further extract a segment of the binary software code that stores constant values used by the binary software code. For example, if the binary software code is in the object code configuration, the software service platform can decompress the binary software code to obtain a collection of object files. The collection of object files can include a data segment, in some cases stored as a .data or a .h file, that stores constant values. Therefore, the software service platform can locate the data segment by searching for .data or .h file in the collection of object files. In some cases, there can be more than one data segments in the binary software code.

If the binary software code was developed using JAVA, the binary software code may be in a bytecode configuration. In these cases, the configuration information in the header of the binary software code can indicate information of one or more constant tables that store constants used by the binary software code. The information can include locations of the constant tables and the numbers of entries in the constant tables. Based on the configuration information, the software service platform can extract the constant tables from the binary software code.

If the software service platform extracts data segments that include the constant values, the software service platform can scan these data segments to identify network addresses used by the binary software code. Comparing to scanning the entire binary software code for network addresses, this approach simplifies the scanning process, and therefore saves time and computing resources. In some cases, e.g., the binary software code is submitted in an executable file and the binary software code was developed using native languages such as C, the software service platform may not be able to extract these data segments. In these cases, the software service platform can scan the entire binary software code to determine network addresses that are accessed by the binary software code.

In some implementations, in addition to, or as an alternative to, the scanning of the binary software code, the binary software code can be disassembled into assembly code. The assembly code can be parsed into different assembly instructions. The software service platform can search the assembly instructions to determine network addresses that are accessed by the binary software code.

In some cases, the identified text strings that are encoded in the binary software code can be used to determine one or more hardcoded user credentials. For example, the text strings can include at least one of a hardcoded user name or a hardcoded password. The hardcoded user name or hardcoded password can be identified by identifying high entropy strings in the binary software code. A high entropy string can represent a string having high likelihood of being a secret. In some cases, the text string can be analyzed in relation to the function call that includes the text string to determine whether the text string includes hardcoded user credential. For example, if a text string is included in an API call indicative of authentication check, the text string may be identified as a hardcoded username or a hardcoded password. In some cases, the one or more hardcoded user credentials can be indicative of potential backdoors.

In some cases, the identified text strings that are encoded in the binary software code can be used to determine one or more library calls indicative of a potential backdoor. For example, a library call can be identified as a potential backdoor if the library call is used to open a port, execute a protocol of a predetermined list of protocols, call an API of a predetermined list of APIs, establish an out-of-band connection, call a network-exposed interface, bypass an authentication by hidden parameters, run a custom DNS query, enable a debug interface, or execute a function (e.g., runtime.exec()) that allows arbitrary command by user controlled input.

In some cases, the server identifies a text string as a potential backdoor based on the context and use of the text string. The context of the text sting can be indicated by the text string itself, location of the text string, and/or the library call or function it is used in. For example, when a text string is identified as being used as hardcoded user credential in a library call, further analysis is performed to identify the function of the library call. A library call used to open a connection can be a potential backdoor, whereas a library call used to print documents may not be a potential backdoor. For another example, when a text string is identified as a high entropy string, further analysis can be performed to identify the use of the high entropy string. If the high entropy string is a parameter of a predetermined function call (e.g., an API call indicative of authentication check), the high entropy string can be a potential backdoor.

Example types of backdoor markers that the server seek in the binary software code include, but not limited to, open ports, out-of-band connections, hardcoded accounts, network exposed interfaces, authentication bypass by hidden parameters (this can be detected in the binary software code by password handling code), custom DNS queries, debug interfaces enabled, functions and code paths that allow arbitrary command execution by user controlled input (e.g., runtime.exec()), or other attributes as appropriate.

In some cases, the server can generate a backdoor abstraction of the binary software code to include the potential backdoors discussed above. An example backdoor abstraction of the binary software code in JSON is shown below:

```
{"Backdoor-markers":
    {
    "open-ports": [22, 80, 4444]
    "outbound-urls":    ["www.legitimate-url.com",    "www.legitimate-url.com",
    www.evil.com]
    "hard-coded-accounts": [
        {
        "username": "john",
        "password": "password"
        },
        {
        "username": "fred",
        "password": "password2"
        }
    ]
    }
}
```

At step 206, the method 200 generates a backdoor risk assessment based on the backdoor abstraction of the binary software code. In some implementations, the server can determine whether a potential backdoor in the backdoor abstraction of the binary software code is also in the source code by using at least one of the following two approaches.

In the first approach, the server can parse the source code to search for each individual potential backdoor and determine whether the individual potential backdoor is in the source code. If at least a part of the source code corresponds to a potential backdoor in the backdoor abstraction of the binary software code, the server can determine that the potential backdoor is not inserted during the build process. The server then does not include the potential backdoor in the backdoor risk assessment. On the contrary, if none of the source code corresponds to a potential backdoor in the backdoor abstraction of the binary software code, the server can determine that the potential backdoor may be inserted during the build process. The server can then include the potential backdoor in the backdoor risk assessment.

In the second approach, the server can parse the source code and produce a backdoor abstraction of the source code. The server can then compare the backdoor abstraction of the binary software code and the backdoor abstraction of the source code to determine whether a potential backdoor in the backdoor abstraction of the binary software code is also in the backdoor abstraction of the source code. If a potential backdoor is in both of the backdoor abstraction of the binary software code and the backdoor abstraction of the source code, the server can determine that the potential backdoor is not inserted during the build process. The server then does not include the potential backdoor in the backdoor risk assessment. On the contrary, if a potential backdoor is in the backdoor abstraction of the binary software code but is not in the backdoor abstraction of the source code, the server can determine that the potential backdoor may be inserted during the build process. The server can then include the potential backdoor in the backdoor risk assessment.

In some cases, the server can output the backdoor risk assessment. For example, the server can send the backdoor risk assessment to another device (e.g., the software developer device that submits the binary software code), or output the backdoor risk assessment in a user interface (UI) of the server. The backdoor risk assessment can then be further reviewed manually or by other computer-implemented review methods to confirm whether each potential backdoor in the backdoor risk assessment is a genuine backdoor.

In some cases, a binary software code can have a high degree of confidence or assurance. For example, the binary software code does not include any potential backdoor or all potential backdoor(s) in the binary software code are also in its corresponding source code. When the binary software code has a high degree of confidence or assurance, the server can store, as a reliable baseline, the binary software code, its corresponding source code, the backdoor abstraction of the binary software code, or the backdoor abstraction of the source code. When the server checks a later version of the binary software code for potential backdoors, the server can only check the relative difference in the later version of the binary software code against the reliable baseline. For example, when the reliable baseline is the backdoor abstraction of the binary software code, the server can generate a backdoor abstraction of the later version of the binary software code, compare the backdoor abstraction of the later version of the binary software code with the reliable baseline to identify differences of the two abstractions, and detect potential backdoors in the differences of the two abstractions.

FIG. 3 illustrates a high level architecture block diagram of a computer 300 according to an implementation. The computer 300 can be implemented as one of the software developer device 102, the software service platform 106, and the client device 108 of FIG. 1. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The computer 300 includes a computing system configured to perform the algorithm described in this disclosure. In some cases, the computer 300 may include a computing system implementing processes and methods disclosed in FIG. 2. In some cases, the algorithm can be implemented in an executable computing code, e.g., C/C++ executable codes. In some cases, the computer 300 can include a standalone Linux system that runs batch applications. In some cases, the computer 300 can include mobile or personal computers.

The computer 300 may comprise a computer that includes an input device, such as a keypad, keyboard, touch screen, microphone, speech recognition device, other device that can accept user information, and/or an output device that conveys information associated with the operation of the computer, including digital data, visual and/or audio information, or a GUI.

The computer 300 can serve as a client, network component, a server, a database or other persistency, and/or any other components. In some implementations, one or more components of the computer 300 may be configured to operate within a cloud-computing-based environment.

At a high level, the computer 300 is an electronic computing device operable to receive, transmit, process, store, or manage data. According to some implementations, the computer 300 can also include or be communicably coupled with an application server, e-mail server, web server, caching server, streaming data server, business intelligence (BI) server, and/or other server.

The computer 300 can collect data of network events or mobile application usage events over network 110 from a web browser or a client application, e.g., an installed plugin. In addition, data can be collected by the computer 300 from internal users (e.g., from a command console or by another appropriate access method), external or third parties, other automated applications, as well as any other appropriate entities, individuals, systems, or computers.

Each of the components of the computer 300 can communicate using a system bus 312. In some implementations, any and/or all the components of the computer 300, both hardware and/or software, may interface with each other and/or the interface 302 over the system bus 312 using an API 308 and/or a service layer 310. The API 308 may include specifications for routines, data structures, and object classes. The API 308 may be either computer language-independent or -dependent and refer to a complete interface, a single function, or even a set of APIs. The service layer 310 provides software services to the computer 300. The functionality of the computer 300 may be accessible for all service consumers using this service layer. Software services, such as those provided by the service layer 310, provide reusable, defined business functionalities through a defined interface. For example, the interface may be software written in JAVA, C++, or other suitable languages providing data in Extensible Markup Language (XML) format or other suitable format. While illustrated as an integrated component of the computers 300, alternative implementations may illustrate the API 308 and/or the service layer 310 as stand-alone components in relation to other components of the computer 300. Moreover, any or all parts of the API 308 and/or the service layer 310 may be implemented as child or sub-modules of another software module, enterprise application, or hardware module without departing from the scope of this disclosure.

The computer 300 includes an interface 302. Although illustrated as a single interface 302 in FIG. 3, two or more interfaces 302 may be used according to particular needs, desires, or particular implementations of the computer 300. The interface 302 is used by the computer 300 for communicating with other systems in a distributed environment connected to a network (whether illustrated or not). Generally, the interface 302 comprises logic encoded in software and/or hardware in a suitable combination and operable to communicate with the network. More specifically, the interface 302 may comprise software supporting one or more communication protocols associated with communications such that the network or interface's hardware is operable to communicate physical signals within and outside of the computer 300.

The computer 300 includes at least one processor 304. Although illustrated as a single processor 304 in FIG. 3, two or more processors may be used according to particular needs, desires, or particular implementations of the computer. Generally, the processor 304 executes instructions and manipulates data to perform the operations of the computer 300. Specifically, the processor 304 executes the functionality required for detecting backdoors in binary software code disclosed in FIG. 2.

The computer 300 also includes a memory 314 that holds data for the computer 300. Although illustrated as a single memory 314 in FIG. 3, two or more memories may be used according to particular needs, desires, or particular implementations of the computer 300. While memory 314 is illustrated as an integral component of the computer 300, in alternative implementations, memory 314 can be external to the computer 300.

The application 306 is an algorithmic software engine providing functionality according to particular needs, desires, or particular implementations of the computer 300, particularly with respect to functionality required for anomaly detection. Although illustrated as a single application 306, the application 306 may be implemented as multiple applications 306 on the computer 300. In addition, although illustrated as integral to the computer 300, in alternative implementations, the application 306 can be external to the computer 300.

There may be any number of computers 300 associated with, or external to, and communicating over a network. Further, this disclosure contemplates that many users may use one computer 300, or that one user may use multiple computers 300.

Described implementations of the subject matter can include one or more features, alone or in combination.

For example, in a first implementation, a method, comprising: obtaining, by a server, binary software code corresponding to source code; generating, by the server, a backdoor abstraction of the binary software code; and generating, by the server, a backdoor risk assessment based on the backdoor abstraction of the binary software code.

The foregoing and other described implementations can each, optionally, include one or more of the following features:

A first feature, combinable with any of the following features, wherein generating the backdoor abstraction comprises: identifying, by the server, one or more library calls indicative of a potential backdoor in the binary software code; and including, by the server and in the backdoor abstraction of the binary software code, a potential backdoor representation corresponding to the one or more library calls.

A second feature, combinable with any of the following features, wherein generating the backdoor abstraction comprises: determining, by the server, that the binary software code comprises a string; and including, by the server, a potential backdoor representation corresponding to the string in the backdoor abstraction of the binary software code.

A third feature, combinable with any of the following features, wherein the string comprises at least one of: a Uniform Resource Locator (URL); a hardcoded user credential; or a high entropy string.

A fourth feature, combinable with any of the following features, wherein generating the backdoor risk assessment comprises: comparing the backdoor abstraction of the binary software code and a backdoor abstraction of the source code.

A fifth feature, combinable with any of the following features, wherein generating the backdoor risk assessment comprises: determining, by the server, that at least a part of the source code corresponds to a risk comprised in the backdoor abstraction; and in response to determining that the at least a part of the source code corresponds to the risk, determining that the risk is not included in the backdoor risk assessment.

A sixth feature, combinable with any of the following features, comprising: storing, by the server, the backdoor abstraction of the binary software code as a baseline; obtaining, by the server, additional binary software code; generating, by the server, an additional backdoor abstraction of the additional binary software code; and generating, by the server, an additional backdoor risk assessment based on the baseline and the additional backdoor abstraction.

In a second implementation, a computer-readable medium containing instructions which, when executed, cause a computing device to perform operations comprising: obtaining, by a server, binary software code corresponding to source code; generating, by the server, a backdoor abstraction of the binary software code; and generating, by the server, a backdoor risk assessment based on the backdoor abstraction of the binary software code.

The foregoing and other described implementations can each, optionally, include one or more of the following features:

A first feature, combinable with any of the following features, wherein generating the backdoor abstraction comprises: identifying, by the server, one or more library calls indicative of a potential backdoor in the binary software code; and including, by the server and in the backdoor abstraction of the binary software code, a potential backdoor representation corresponding to the one or more library calls.

A second feature, combinable with any of the following features, wherein generating the backdoor abstraction comprises: determining, by the server, that the binary software code comprises a string; and including, by the server, a potential backdoor representation corresponding to the string in the backdoor abstraction of the binary software code.

A third feature, combinable with any of the following features, wherein the string comprises at least one of: a Uniform Resource Locator (URL); a hardcoded user credential; or a high entropy string.

A fourth feature, combinable with any of the following features, wherein generating the backdoor risk assessment comprises: comparing the backdoor abstraction of the binary software code and a backdoor abstraction of the source code.

A fifth feature, combinable with any of the following features, wherein generating the backdoor risk assessment comprises: determining, by the server, that at least a part of the source code corresponds to a risk comprised in the backdoor abstraction; and in response to determining that the at least a part of the source code corresponds to the risk, determining that the risk is not included in the backdoor risk assessment.

A sixth feature, combinable with any of the following features, comprising: storing, by the server, the backdoor abstraction of the binary software code as a baseline; obtaining, by the server, additional binary software code; generating, by the server, an additional backdoor abstraction of the additional binary software code; and generating, by the server, an additional backdoor risk assessment based on the baseline and the additional backdoor abstraction.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: obtaining, by a server, binary software code corresponding to source code; generating, by the server, a backdoor abstraction of the binary software code; and generating, by the server, a backdoor risk assessment based on the backdoor abstraction of the binary software code.

The foregoing and other described implementations can each, optionally, include one or more of the following features:

A first feature, combinable with any of the following features, wherein generating the backdoor abstraction comprises: identifying, by the server, one or more library calls indicative of a potential backdoor in the binary software code; and including, by the server and in the backdoor abstraction of the binary software code, a potential backdoor representation corresponding to the one or more library calls.

A second feature, combinable with any of the following features, wherein generating the backdoor abstraction comprises: determining, by the server, that the binary software code comprises a string; and including, by the server, a potential backdoor representation corresponding to the string in the backdoor abstraction of the binary software code.

A third feature, combinable with any of the following features, wherein the string comprises at least one of: a Uniform Resource Locator (URL); a hardcoded user credential; or a high entropy string.

A fourth feature, combinable with any of the following features, wherein generating the backdoor risk assessment comprises: comparing the backdoor abstraction of the binary software code and a backdoor abstraction of the source code.

A fifth feature, combinable with any of the following features, wherein generating the backdoor risk assessment comprises: determining, by the server, that at least a part of the source code corresponds to a risk comprised in the backdoor abstraction; and in response to determining that the at least a part of the source code corresponds to the risk, determining that the risk is not included in the backdoor risk assessment.

A sixth feature, combinable with any of the following features, comprising: storing, by the server, the backdoor abstraction of the binary software code as a baseline; obtaining, by the server, additional binary software code; generating, by the server, an additional backdoor abstraction of the additional binary software code; and generating, by the server, an additional backdoor risk assessment based on the baseline and the additional backdoor abstraction.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a ROM or a RAM or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a PDA, a mobile audio or video player, a game console, a GPS receiver, or a portable storage device, e.g., a USB flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD±R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD, LED, or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a WLAN using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship with each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

The invention claimed is:

1. A method, comprising:
   obtaining, by a server, binary software code corresponding to source code;
   generating, by the server, a backdoor abstraction of the binary software code by identifying one or more library calls indicative of a potential backdoor in the binary software code; and
   generating, by the server, a backdoor risk assessment based on the backdoor abstraction of the binary software code, wherein generating the backdoor risk assessment comprises:
      determining, by the server, that none of the source code corresponds to the potential backdoor in the backdoor abstraction of the binary software code by parsing the source code to search for the potential backdoor; and
      in response to determining that none of the source code corresponds to the potential backdoor, determining that a risk is inserted during a generation of the binary software code corresponding to the source code and including the risk in the backdoor risk assessment.

2. The method of claim 1, wherein generating the backdoor abstraction comprises:
   including, by the server and in the backdoor abstraction of the binary software code, a potential backdoor representation corresponding to the one or more library calls.

3. The method of claim 1, wherein generating the backdoor abstraction comprises:
   determining, by the server, that the binary software code comprises a string; and
   including, by the server, a potential backdoor representation corresponding to the string in the backdoor abstraction of the binary software code.

4. The method of claim 3, wherein the string comprises at least one of:
   a Uniform Resource Locator (URL);
   a hardcoded user credential; or
   a high entropy string.

5. The method of claim 1, wherein generating the backdoor risk assessment comprises:
   comparing the backdoor abstraction of the binary software code and a backdoor abstraction of the source code.

6. The method of claim 1, comprising:
   storing, by the server, the backdoor abstraction of the binary software code as a baseline;
   obtaining, by the server, additional binary software code;
   generating, by the server, an additional backdoor abstraction of the additional binary software code; and
   generating, by the server, an additional backdoor risk assessment based on the baseline and the additional backdoor abstraction.

7. A non-transitory computer-readable medium containing instructions which, when executed, cause a computing device to perform operations comprising:
   obtaining, by a server, binary software code corresponding to source code;
   generating, by the server, a backdoor abstraction of the binary software code by identifying one or more library calls indicative of a potential backdoor in the binary software code; and
   generating, by the server, a backdoor risk assessment based on the backdoor abstraction of the binary software code, wherein generating the backdoor risk assessment comprises:
      determining, by the server, that none of the source code corresponds to the potential backdoor in the backdoor abstraction of the binary software code by parsing the source code to search for the potential backdoor; and
      in response to determining that none of the source code corresponds to the potential backdoor, determining that a risk is inserted during a generation of the binary software code corresponding to the source code and including the risk in the backdoor risk assessment.

8. The non-transitory computer-readable medium of claim 7, wherein generating the backdoor abstraction comprises:
   including, by the server and in the backdoor abstraction of the binary software code, a potential backdoor representation corresponding to the one or more library calls.

9. The non-transitory computer-readable medium of claim 7, wherein generating the backdoor abstraction comprises:
   determining, by the server, that the binary software code comprises a string; and
   including, by the server, a potential backdoor representation corresponding to the string in the backdoor abstraction of the binary software code.

10. The non-transitory computer-readable medium of claim 9, wherein the string comprises at least one of:
    a Uniform Resource Locator (URL);
    a hardcoded user credential; or
    a high entropy string.

11. The non-transitory computer-readable medium of claim 7, wherein generating the backdoor risk assessment comprises:
    comparing the backdoor abstraction of the binary software code and a backdoor abstraction of the source code.

12. The non-transitory computer-readable medium of claim 7, comprising:
    storing, by the server, the backdoor abstraction of the binary software code as a baseline;
    obtaining, by the server, additional binary software code;
    generating, by the server, an additional backdoor abstraction of the additional binary software code; and generating, by the server, an additional backdoor risk assessment based on the baseline and the additional backdoor abstraction.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining, by a server, binary software code corresponding to source code;

generating, by the server, a backdoor abstraction of the binary software code by identifying one or more library calls indicative of a potential backdoor in the binary software code; and generating, by the server, a backdoor risk assessment based on the backdoor abstraction of the binary software code, wherein generating the backdoor risk assessment comprises:

determining, by the server, that none of the source code corresponds to the potential backdoor in the backdoor abstraction of the binary software code by parsing the source code to search for the potential backdoor; and in response to determining that none of the source code corresponds to the potential backdoor, determining that a risk is inserted during a generation of the binary software code corresponding to the source code and including the risk in the backdoor risk assessment.

14. The computer-implemented system of claim 13, wherein generating the backdoor abstraction comprises:

including, by the server and in the backdoor abstraction of the binary software code, a potential backdoor representation corresponding to the one or more library calls.

15. The computer-implemented system of claim 13, wherein generating the backdoor abstraction comprises:

determining, by the server, that the binary software code comprises a string; and including, by the server, a potential backdoor representation corresponding to the string in the backdoor abstraction of the binary software code.

16. The computer-implemented system of claim 15, wherein the string comprises at least one of:

a Uniform Resource Locator (URL);

a hardcoded user credential; or a high entropy string.

17. The computer-implemented system of claim 13, wherein generating the backdoor risk assessment comprises:

comparing the backdoor abstraction of the binary software code and a backdoor abstraction of the source code.

18. The computer-implemented system of claim 13, the one or more operations comprising:

storing, by the server, the backdoor abstraction of the binary software code as a baseline;

obtaining, by the server, additional binary software code;

generating, by the server, an additional backdoor abstraction of the additional binary software code; and generating, by the server, an additional backdoor risk assessment based on the baseline and the additional backdoor abstraction.

* * * * *